March 14, 1961  H. N. SCHOFER  2,974,902
POWER PLANT FOR HELICOPTER
Filed July 6, 1959
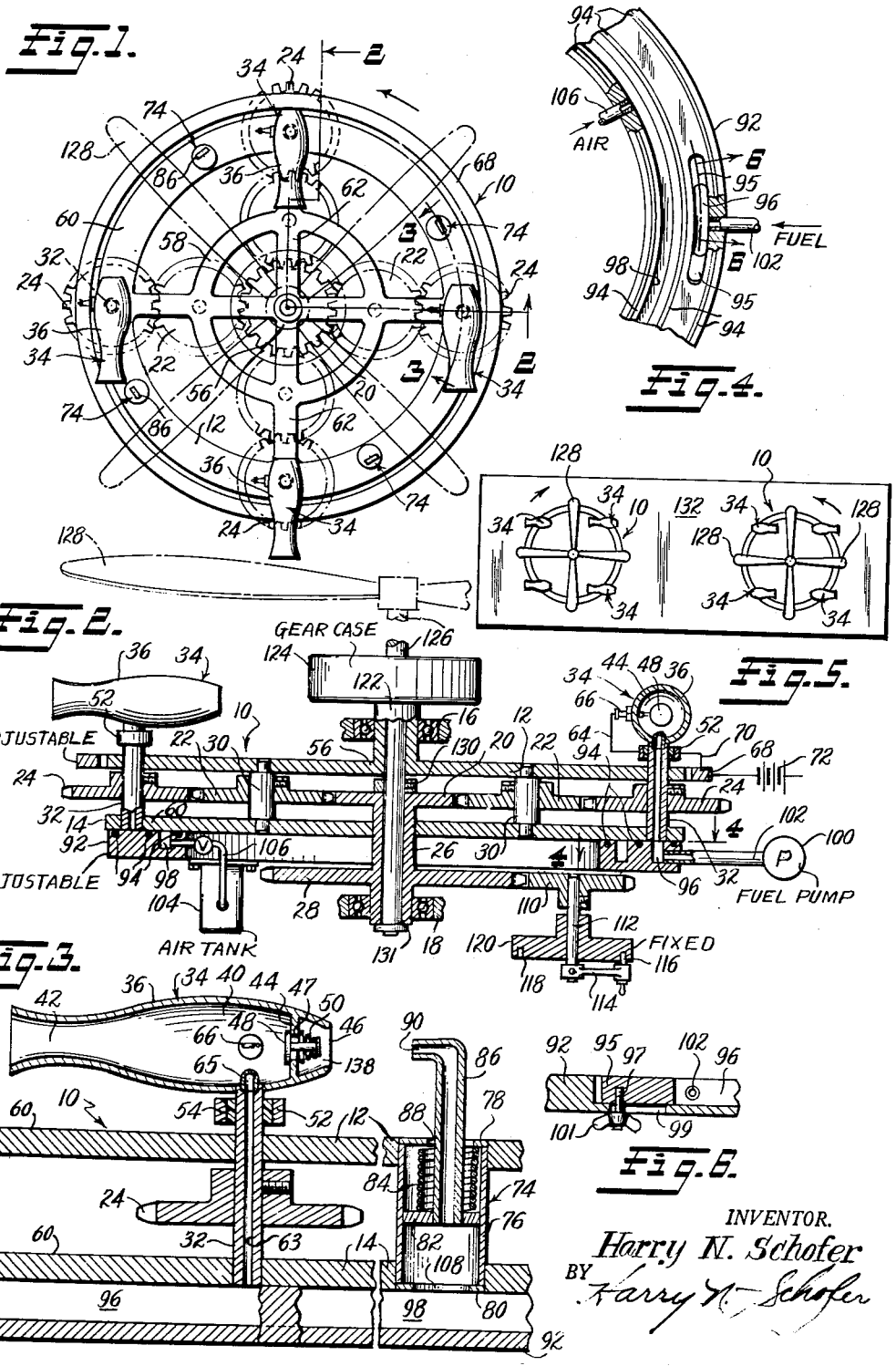
INVENTOR.
Harry N. Schofer

United States Patent Office 2,974,902
Patented Mar. 14, 1961

2,974,902
POWER PLANT FOR HELICOPTER
Harry N. Schofer, 8809 Woodland Drive, Silver Spring, Md.
Filed July 6, 1959, Ser. No. 825,115
19 Claims. (Cl. 244—17.19)

This invention relates to a novel power plant, and more specifically to a novel power plant for a helicopter in which the power plant provides both rotational and linear or horizontal thrust.

The well-known form of helicopter in use today comprises a vertically disposed air screw or propeller, and an internal combustion engine which delivers rotational motion to the propeller. Such rotational motion provides an upward thrust to the vertically disposed propeller, and linear or horizontal thrust is obtained by tilting the axis of the propeller to provide a lateral component in the desired direction. This involves the use of a rather complex tilting mechanism, which has proven to be a source of trouble at times. Instead of a conventional internal combustion engine, it has been proposed to mount reaction motors on the tips of the propeller, or to employ a combustion gas turbine as the source of power for the propeller shaft. In these devices, the tilting propeller shaft must be provided to obtain horizontal traverse.

It is an object of this invention to provide a novel form of helicopter which does not require the use of a tiltable propeller shaft to obtain horizontal traverse.

It is a further object of this invention to provide a power plant employing a reaction motor or motors which revolve about an axis of a rotor which carries the reaction motor or motors, including means to synchronously orient the longitudinal axis of each motor or motors so that said axis is always aligned in the same direction.

It is a further object of the invention to provide a power plant including means to selectively change the direction or orientation of the longitudinal or thrust axis of the motor or motors, during operation, to change the direction of the linear or horizontal thrust.

It is a further object of the invention to provide a helicopter having a power plant in which the ratio of the rotational thrust to the linear thrust or horizontal thrust may be selectively varied, in order to vary the ratio of the vertical lift to the horizontal traverse.

It is a further object of the invention to provide a power plant of the type described above in combination with a vertical lift propeller, and a means between the power plant and the propeller to vary the speed ratio.

It is a further object of the invention to provide a novel helicopter employing one or more pairs of power plants, each connected with a vertical lift propeller, in which the power plants and propellers are arranged to rotate in opposite directions.

It is a further object of the invention to provide a helicopter employing one or more pairs of power plants, each connected with a vertical lift propeller, in which the power plants and propellers are arranged to rotate in opposite directions, including means to change the relative angular relations of the longitudinal or thrust axes of the reaction propulsion means on each power plant, so that the longitudinal or horizontal thrusts of the several power plants may oppose and nullify each other, whereby there will be no resultant horizontal traverse and all of the available output is utilized for vertical lift, or the longitudinal axes may be arranged in parallel, so that both power plants cooperate to produce a linear or horizontal traverse in the same direction as well as a rotational thrust to give a vertical lift.

It is a further object of the invention to provide a novel method of operating a power plant of the type disclosed, in which the ratio of the rotational thrust and linear or horizontal thrust may be selectively varied.

It is a further object of the invention to provide a novel method of operating a power plant of the type disclosed utilizing a pair of rotors rotating in opposite directions, in which the linear or horizontal thrusts may be adjusted to oppose each other, or to assist each other in producing horizontal traverse.

It is a further object of the invention to provide a novel starting arrangement for a power plant of the type disclosed involving the use of retractible reaction nozzles the effluent from which is used to assist in the charging of the combustion chambers.

It is a still further object of the invention to provide an adjustable fuel feeding means permitting a variation of the duration of the fuel injection period of each combustion chamber.

With these and other objects in view, as will become more apparent from a consideration of the disclosure appearing below, the invention consists of the parts, features, and combinations set forth in the description below and in the accompanying drawing, in which:

Fig. 1 is a plan view of the power plant in which the vertical lift propeller appears in phantom lines;

Fig. 2 is a sectional view taken along the line 2—2 of Fig. 1;

Fig. 3 is an enlarged sectional view through one of the reaction motors and one of the starting motors, taken on the line 3—3 of Fig. 1;

Fig. 4 is a plan view of the adjustable feeding ring, taken on the line 4—4 of Fig. 2;

Fig. 5 is a plan view showing two power plants on a helicopter; and

Fig. 6 is a sectional view taken on the line 6—6 of Fig. 4, showing means to vary the duration of the fuel injection period.

Referring to the schematic drawing, in which the same reference character is employed to designate the same part throughout the several views, the numeral 10 designates the power plant in its entirety.

The power plant comprises an upper rotor 12 and a spaced lower rotor 14, adapted to be supported for rotation from a suitable fixed support, not shown, by an upper bearing 16 and a lower bearing 18. A system of planetary gearing is mounted for rotation between the upper and lower rotors, which gearing comprises a sun gear 20, four planet gears 22, and four outer pinion gears 24. Although four planet gears and four outer pinion gears are shown, it should be understood that a lesser or greater number may be used, depending upon the number of combustion reaction units employed, there being one planet gear and one outer pinion gear for each combustion reaction unit, as will appear hereinafter. Sun gear 20 has a hollow hub portion and includes a depending, hollow extension 26, the lower end of which is supported by lower bearing 18. Spaced from the lower end of extension 26, and integral therewith, is an angle adjusting gear 28 for a purpose to be set forth later. That portion of the extension 26 between sun gear 20 and angle adjusting gear 28 forms a bearing for the lower rotor 14.

Each planet gear 22 is non-rotatably connected to a shaft 30 mounted for rotation in bearings in the upper and lower rotors 12 and 14, and each outer pinion gear 24 is non-rotatably connected to a hollow shaft 32 mounted for rotation in suitable bearings in the upper and lower rotors. The hollow shafts 32 are elongated to include a hollow portion extending above the upper surface of the rotor 12, on which are mounted the combustion reaction motors 34.

Each combustion reaction motor comprises an elongated tubular housing 36 of appropriate form including an inlet chamber 38, a combustion chamber 40, and an outlet reaction nozzle 42. A partition 44, having a central orifice 47 therein, separates inlet chamber 38 from combustion chamber 40. The front end of tubular housing 36 has an inlet opening 46 to admit atmospheric air into the inlet chamber 38. Inlet chamber 38 increases in cross section from the opening 46 toward the partition 44 to provide an expansion chamber for the incoming air, in which a part of the velocity head of the air is converted into pressure head. Partition 44 provides a valve seat for a poppet valve 48 which is adapted to open to allow the flow of atmospheric air under pressure from inlet chamber 38 into the combustion chamber 40. A light compression spring 50, within inlet chamber 38, urges the valve 48 toward its closed position.

The upper and lower rotors 12 and 14 are made up of a central ring 56, and spaced, concentric, intermediate ring 58 and outer ring 60, held in spaced relation by a plurality of integral, radial, arms 62.

The hollow shafts 32 form fuel conduits 63 which extend the length thereof. The lower end of each conduit is flush with the lower surface of outer ring 60 of lower rotor 14, and the upper end discharges through a fuel injector 65 into the combustion chamber 40 of the combustion reaction motor 34. An electrical conductive ring or collar 52 surrounds the upper end of the shafts 32 just below their connection with the reaction motors 34, each collar being separated from the shafts by means of a non-conductive sleeve 54. An electrical conductor 64 connects each collar 52 with a spark plug 66 extending into each combustion chamber 40. A rotary adjustable igniter ring 68 is mounted adjacent the upper rotor 12 and concentrically therewith, and carries a wiper 70 which lies in the path of the collars 52 on the shafts 32 as they revolve around the center of rotation of the rotors 12 and 14. Rotary adjustable ring 68 and wiper 70 are connected to a source of high potential electric current schematically shown at 72 in Fig. 2 of the drawing.

A starting reaction motor, designated by the reference numeral 74, is mounted in the rotors 12 and 14 slightly in advance of each combustion reaction motor 34, as shown in Fig. 1, in which the power plant is assumed to rotate in a counterclockwise direction as indicated by the arrow. Each starting reaction motor comprises a cylinder 76 including an upper closure 78 and a lower closure 80. A piston 82 is mounted in the cylinder 76 for reciprocation therein, being urged toward its lowermost position by a spring 84 engaging the upper closure 78 and the piston 82. An upstanding reaction nozzle 86 is carried by the piston 82, and extends through an opening 88 in the upper closure 78. Each nozzle 86 is provided, at its upper end, with a horizontally, rearwardly, directed discharge port 90 for the discharge of fluid from the nozzle. As shown in Fig. 3, in which the piston 82 and reaction nozzle 86 are in their elevated position, the discharge port 90 is at the same elevation and slightly in advance of the opening 46 into the combustion reaction motor 34, so that the effluent from the discharge port 90 enters the opening 46 during a portion of the cycle for a purpose to be set forth hereinafter.

An adjustable feeding ring 92 cooperates with outer ring 60 of lower rotor 14 to supply fuel to the combustion reaction motors 34, and compressed gas, as, for example, air, to the starting jets 74. The upper surface of the feeding ring 92 engages, in sliding contact, the lower surface of outer ring 60 of lower rotor 14, and is provided with three spaced, concentric, sealing rings 94. An arcuate channel 96, approximately 15 degrees in arcuate extent, is provided between the center and outer sealing rings, and a circular channel 98, which is 360 degrees in arcuate extent, is provided between the center and the inner sealing rings. The opposite ends of arcuate channel 96 are closed by adjustable sliding end pieces 95, shown in Fig. 6. Each end piece 95 is provided with a pin 97 which extends through a slot 99 in the bottom of arcuate channel 96. That portion of pin 97 which extends outside of slot 99 is threaded to receive a wing nut 101 to retain the sliding end pieces in adjusted position. By slidably adjusting the end pieces 95, the arcuate extent of channel 96, and thereby the duration of fuel injection, may be varied. A fuel pump 100 (Fig. 2) feeds fuel, under regulated pressure, by means of a connection 102, while a gas tank 104 supplies a gas under pressure to the arcuate channel 98 by means of a valved connection 106. An opening 108 in the lower closure 80 of cylinder 76 provides a connection between the annular channel 98 and the space in cylinder 76 below the piston 82 therein.

The angle adjusting gear 28 meshes with a pinion 110 connected with the upper end of a shaft 112 for adjusting the direction of reaction of the combustion reaction motors 34. A lever 114 is rigidly connected to the lower end of the shaft 112, the free end of which carries a spring urged latching pin 116 adapted to engage any one of a series of latch receiving notches 118 spaced in a ring on a stationary member 120.

The central ring 56 of the upper rotor 12 carries an upwardly projecting, hollow, extension 122 serving as a power output shaft, which extends through upper bearing 16 into a gear case 124. Gear case 124 schematically represents a speed change gearing housing or a hydraulic transmission, from which extends an output shaft 126 passing downwardly through the extensions 122 and 26, and upwardly above the gear casing 124 where it is connected with a vertical lift propeller 128. A bearing collar 130, secured to the shaft 126 by a set screw, rests on the upper surface of sun gear 20. A bearing collar 131 on the lower end of the shaft 126 engages the lower end of the extension 26.

The sun gear 20, planet gears 22 and outer gears 24 have the same diameter and the same number of teeth. It should be noted that the outer pinion gears 24 are non-rotatably connected with the shafts 32 carrying the combustion reaction motors 34, and that the longitudinal axes of the four combustion reaction motors are always parallel to each other and to a vertical plane passing through the vertical axis of the power plant. If the reaction motors 34 were non-rotatably mounted on the rotors 12 and 14, they would rotate once about their vertical axes for each revolution they made about the axis of the rotors 12 and 14. In orbiting about the axis of the rotors 12 and 14, the front end of the reaction motor at the right in Fig. 1, or the 3 o'clock position, is directed upwardly. If revolved 90° the front end would turn 90° and would point toward the left. If revolved another 90°, the front end would be directed downwardly, and by the time the reaction motor made a complete 360° orbit, it would rotate 360° about its own vertical axis. The system of planetary gearing described prevents such rotation about the vertical axis of each reaction motor as it orbits around the axis of the rotors 12 and 14, and maintains the thrust axis at a definite predetermined angle relative to a given plane through the rotor including the rotor axis. As the rotors 12 and 14 rotate about the central axis, and the sun gear is held stationary, the combustion reaction motors are restrained against rotation about the axis of the shafts 32. The thrust axes of the combustion reaction motors, therefore, are always parallel to each other and always point in the same direction while revolving or orbiting about the axis of the rotors 12 and 14. By rotating the lever 114, which rotates the pinion 110 and the gear 28 connected with the sun gear 20, the sun gear may be rotated, which changes the angle of the longitudinal or thrust axes of the reaction motors 34 relative to any given plane of reference through the vertical axis of the power plant. For instance, referring to Fig. 1, if the sun gear 20 were rotated 90° in a clockwise direction, each of the four reaction motors 34 would be rotated the same angle in the same direction, and would maintain such direction when the lever 114 is latched in position by means of the latch pin 116. From the foregoing, it is evident that each combustion motor 34 is restrained against rotation about its own axis as its axis revolves about the central vertical axis of the power plant.

The operation is as follows: Assuming that the power plant is not operating, and that the springs 84 of the starting jets 74 have retracted the piston 82 and nozzle 86 to their lowermost position. Assuming also that the tank 104 is filled with compressed air, the valve in the conduit 106 may be opened, admitting air under pressure by way of conduit 106, annular air channel 98, and opening 108 into each cylinder 76 below the piston 82 which raises the piston therein to its uppermost position shown in Fig. 3 in which the axially directed discharge port 90, directed rearwardly with reference to the direction of rotation of the power plant, is at the same level as the longitudinal axis of the combustion reaction motor 34 immediately behind it, as shown in Fig. 3. The compressed air, escaping from the starting jets 74, produces a reaction which causes the power plant to rotate in a counterclockwise direction as shown by the arrow in Fig. 1. Four starting jets are shown, and compressed air is delivered to each jet for a full 360° of rotation, thus producing a strong and continuous starting force. Between the 4 o'clock and 3 o'clock position of Fig. 1, it will be noted that inlet 46 of the combustion reaction motor 34 is directly in line with the effluent from the reaction nozzle 86, so that the effluent air, which is under a high velocity, enters the inlet chamber 38 and the combustion chamber 40 of the combustion reaction motor 34. By angularly adjusting the feeding ring so that the arcuate fuel channel 96 occupies the 3 o'clock position, fuel will enter each combustion chamber through the open lower ends of the fuel ducts 63 within the shafts 32, which ducts allow the fuel to enter, by way of fuel injectors 65, into the combustion chamber 40 of each reaction motor as the lower end of each shaft passes over the arcuate fuel channel 96. The air entering through the valve 48, which is forced open by the pressure of the air in the inlet chamber 38, is mixed with the fuel. By angularly adjusting the ignition ring 68, the wiper 70 thereon can be positioned to brush against the conducting ring 52 on shaft 32 at the instant the fuel is injected. Spark plug 66 is thereby energized, igniting the fuel charge in the combustion chamber 40, resulting in a rapid rise in pressure which is effective to close the inlet valve 48. The gases escape through the reaction nozzle 42 at high velocity, producing a thrust in a counterclockwise direction. Each reaction motor, as it passes over the arcuate fuel channel 96, receives a fuel charge, which is ignited. The power plant thereby receives four power thrusts each rotation, which quickly brings it up to its operating speed, at which time the supply of compressed air to the starting jets may be discontinued. As soon as the supply of air is discontinued to the starting jets, the spring 84 retracts the piston 82 and the reaction nozzle 86 in each cylinder 76 to their lowermost position, in which they will be out of the way of the blast from the combustion reaction motors.

Following the explosion cycle in each combustion chamber, the gases quickly escape from the outlet nozzle 42, resulting in a subatmospheric pressure therein, as is typical in combustion motors of this type. This low pressure in the combustion chamber and the high pressure air in the inlet chamber 38, in which the incoming air is permitted to expand to change a part of its velocity head to pressure head, cause the inlet valve 48 to open, permitting a scavenging of the combustion chamber and leaving it filled with air. By this time the combustion reaction motor has passed the 12 o'clock position while moving in a counterclockwise direction. Between the 12 o'clock and the 6 o'clock position, the reaction nozzle 42 becomes the leading end. Due to the relative motion of the reaction motor and the surrounding air, the air is rammed into the open end of the reaction nozzle 42 and serves to compress, or to supercharge, the air in combustion chamber 40, the valve 48 being maintained closed because of the higher pressure in the combustion chamber 40 assisted by the light compression spring 50. As the reaction motor continues its counterclockwise movement about the central vertical axis of the power plant, it again passes over the arcuate fuel channel 96, and is again charged with fuel and ignited by the wiper 70.

In the description of operation above, it has been assumed that the fuel was injected into each combustion chamber 40 and ignited therein in the neighborhood of the 3 o'clock position. Let us assume that it is desired to operate the power plant to produce a rotary motion about the central axis thereof, and at the same time to produce a linear movement toward the top of the drawing of Fig. 1. If we consider that all forces are applied about the center of rotation of the power plant, the explosion at the 3 o'clock position will produce a large rotational thrust and a relatively small linear thrust on the power plant, because of the long moment arm of the combustion reaction motor with reference to a vertical plane passing through the axis of rotation and the direction of linear movement, assuming that linear movement is toward the top of the drawing. If the explosion occurred at the 12 o'clock position, or at the 6 o'clock position, in which the combustion reaction motors have a zero moment arm with reference to said plane, practically all of the thrust will be effective to produce a linear movement of the power plant in the desired direction through the center of rotation and there will be no rotational component, since the line of thrust from the reaction motor is at right angles to the tangent of the direction of movement of the reaction motor. By arranging the explosion to occur at any position between the 6 o'clock position and the 12 o'clock position, assuming counterclockwise rotation, the ratio of linear thrust to rotational thrust may be selectively controlled, so that the maximum rotational thrust is obtained around the 3 o'clock position, and the maximum linear thrust is obtained around the 9 o'clock position. Around the 9 o'clock position, a negative, or a force tending to produce a clockwise rotational force, will be obtained. Around the 12 o'clock and the 6 o'clock positions, the rotational force will be zero, while the linear thrust will be considerable. From the foregoing, it will be apparent that the ratio of rotational and linear thrusts may be selectively varied, and also the direction of rotation. By regulating the rate of fuel delivery, the amount of fuel injected at each fuel charge and consequently the power output of each reaction motor, may be regulated. Also, by rotation of the lever 114, the direction of linear thrust may be selected throughout a 360° range, and the direction of rotation reversed, if desired.

The feeding ring 92 and the ignition ring 68 may be separately adjusted, or, if desired, these rings can be connected for simultaneous adjustment, since the point of fuel injection and the point of ignition are closely related.

The rotational force of the reaction motors is used to produce a rotation of the power plant 10 about its central axis, which rotation is transferred to a vertical lift propeller 128 by way of the extension 122, gears in the gear case 124, and the propeller shaft 126. The propeller 128 may be equipped with the conventional pitch control, and with the conventional mechanism to vary their pitch according to their attitude or their advancing or retreating motion.

Figure 5 illustrates an adaptation of the power plant as applied to a helicopter schematically shown at 132. Two power plants, or plural pairs of power plants are used, spaced the same distance from the center line of the helicopter. Each power plant is of the same type disclosed above, and each may be separately controlled as to direction of linear thrust, ratio of linear thrust, and power output. Figure 5 shows the power plants in the starting position, in which the outlet nozzles from the left hand power plant are directed toward the left, and the reaction nozzles from the right hand power plant are directed toward the right. In this position, the linear forces oppose each other and cancel out, leaving only the rotational forces. The pitch of the vertical lift propellers can be adjusted to produce a zero lift during starting. It is preferred to arrange for the rotation of the power plants in opposite directions, to cancel out precessional torque. The linear thrusts could also be neutralized by arranging the left hand power plant so that the reaction nozzles discharge toward the right, and the right hand power plant so that its reaction nozzles discharge toward the left.

As soon as the power plants are started, the pitch of the vertical lift propellers may be adjusted to give a positive lift if it is desired to ascend vertically, or if both a vertical ascent and a linear movement were desired, the thrust axes of the reaction motors may be moved toward parallelism, gradually nullifying their opposing forces. When the thrust axes of the combustion motors of the right and left hand power plants are parallel, an efficient cruising arrangement is obtained, and by adjusting the ratio of rotational force and linear thrust, as described above, the desired lift and forward speed may be maintained. Maneuvering is accomplished by a combination of controls, that is, (1) by controlling the pitch of the propeller blades; (2) by controlling the speed ratio through the speed change gearing in gear case 124; (3) by controlling the fuel supply; (4) by controlling the relative directions of the linear thrust of the several power plants, thereby counterbalancing the linear thrusts to any desired degree; and (5) by varying the ratio of rotational and linear thrust by adjusting the angular position of the feed and igniter rings.

The gear case, schematically shown at 124, may be a conventional speed change gearing, a torque converter, or a combined torque converter and planetary transmission.

From the foregoing, it is apparent that I have disclosed a power plant that is capable of providing both a rotational force and a linear thrust, and which can be quickly and easily adjusted to vary the ratio of rotational force and linear thrust. The direction of the linear thrust can easily be controlled to give a thrust in any direction throughout 360°, and the force of such thrust can be regulated by varying the quantity of fuel. The power plant is easily started by means of starting jets arranged in front of the combustion reaction motors, which starting jets are effective in quickly bringing the power plant up to operating speed and to employ the effluent therefrom to supercharge the reaction motors. Having served their starting function, the starting jets are automatically retracted so that they will be out of the path of the discharge from the reaction motors, and will present a minimum area which might produce a parasitic drag on the power plant.

While the power plant is disclosed for use on a helicopter in which the rotary motion is applied to a vertical lift propeller, it is evident that it could also be used on other forms of vehicles, such as land vehicles, in which the rotary movement could be used for operating auxiliaries, and also, if desired, to drive ground engaging wheels, while in water vehicles the rotary movement could be used, if desired, to operate a propeller.

Having disclosed my invention and the preferred form of practicing it, I wish it to be understood that I do not wish to be limited by the particular structure described, but that other equivalent forms would be obvious within the scope of the appended claims.

I claim:

1. A power plant, comprising: a rotor having an axis of rotation; reaction propulsion means carried by said rotor to revolve with the rotor, said reaction propulsion means mounted for rotation about an axis parallel with and offset relative to the rotor axis, said propulsion means having a thrust axis normal to its rotational axis to produce rotation of the rotor; and means connected to the reaction propulsion means restraining it against rotation about its axis while revolving about the rotor axis, whereby the thrust axis points in the same direction.

2. A power plant as defined in claim 1, in which the reaction propulsion means comprises a series of reaction motors, spaced about the rotor, the longitudinal axes of the reaction motors being maintained parallel.

3. A power plant, comprising: a rotor having an axis; a series of reaction propulsion motors of the combustion type carried by said rotor to revolve with the rotor, each reaction propulsion motor mounted for rotation about an axis parallel with and offset relative to the rotor axis, each reaction propulsion motor having a thrust axis normal to its rotational axis to produce rotation of the rotor; and means connected to said reaction propulsion motors restraining them against rotation about their axes while revolving about the rotor axis, whereby the thrust axes maintain a definite predetermined angle relative to a given plane including the axis of the rotor.

4. A power plant as defined in claim 3, including means connected to said restraining means to selectively vary the said predetermined angle of the thrust axes relative to said given plane.

5. A power plant as defined in claim 3, including means connected to said restraining means and operable while the rotor is rotating to selectively vary the said predetermined angle of the thrust axes relative to said given plane.

6. A power plant as defined in claim 3, in which said reaction propulsion motors are of the intermittent combustion type having combustion chambers, including means selectively varying the point in their revolution at which the combustion chambers are fired.

7. A power plant as defined in claim 3, in which said reaction propulsion motors are of the intermittent combustion type having fuel injection combustion chambers and ignition means, including means selectively varying the point in their revolution at which the fuel is injected into the combustion chambers and fired.

8. A power plant as defined in claim 3, in which said reaction propulsion motors are of the intermittent combustion type having fuel injection combustion chambers, including means to selectively vary the duration of fuel admission into the combustion chambers.

9. A power plant as defined in claim 3, including retractible reaction motors carried by said rotor to provide a starting torque.

10. A power plant as defined in claim 3, including gas actuated reaction motors carried by said rotor immediately in advance of the combustion type reaction motors, the gas actuated reaction motors being positioned so that their effluent gases discharge into said combustion type reaction motors to facilitate starting of the latter.

11. A power plant as defined in claim 10, in which said gas actuated reaction motors are retractible mounted.

12. A helicopter having a power unit, comprising: at least one power plant, each power plant including a rotor having an axis of rotation; a vertical lift propulsion means, connected to be driven by each rotor; reaction propulsion means carried by each rotor, said reaction propulsion means mounted for rotation about an axis parallel with and offset relative to the rotor axis, said reaction propulsion means having a thrust axis normal to its rotational axis to produce rotation of the rotor; and means connected to the reaction propulsion means restraining it against rotation about its axis while revolving about the rotor axis, whereby the thrust axis maintains a definite predetermined angle relative to a given plane including the axis of the rotor and whereby the reaction propulsion means delivers rotary and longitudinal thrust to the helicopter.

13. A helicopter as defined in claim 12, including means connected to said restraining means to selectively vary the said predetermined angle of the thrust axis relative to said given plane.

14. A helicopter as defined in claim 12, in which the reaction propulsion means is of the intermittent combustion type having combustion chamber means, including means selectively injecting fuel into the combustion chamber means at any point in the 360° of revolution.

15. A helicopter as defined in claim 14, including means selectively igniting the fuel in the combustion chamber means at any point in the 360° of revolution.

16. A helicopter as defined in claim 12, including a selectively variable speed drive between each reaction propulsion means and the vertical lift propulsion means driven therefrom.

17. A helicopter having one or more pairs of power plants, each power plant including a rotor having an axis of rotation; a vertical lift propulsion means connected to be driven by each rotor; reaction propulsion means carried by each rotor, said reaction propulsion means mounted for rotation about an axis parallel with and offset relative to the rotor axis, said reaction propulsion means having a thrust axis normal to its rotational axis to produce rotation of the rotor; means connected to the reaction propulsion means restraining it against rotation about its own axis while revolving about the rotor axis, whereby the thrust axis maintains a definite predetermined angle relative to a given plane including the axis of the rotor, and whereby the reaction propulsion means delivers rotary and longitudinal thrust to the rotor; and independent means connected to said restraining means selectively varying the predetermined angle relative to said given plane, whereby the longitudinal thrusts of the power plants in a pair may selectively oppose or assist each other.

18. A helicopter having one or more pairs of power plants as defined in claim 17, in which the reaction propulsion means carried by one rotor of a pair of rotors rotates in a direction opposite the reaction propulsion means carried by the other rotor of that pair.

19. A method of operating a helicopter of the type having one or more pairs of power plants, each power plant including a rotor having an axis of rotation, a vertical lift propulsion means connected to be driven by each rotor, reaction propulsion means of the fuel injection intermittent combustion type having combustion chamber means carried by each rotor, said reaction propulsion means mounted for rotation about an axis parallel with and offset relative to the rotor axis, said reaction propulsion means having a thrust axis normal to its rotational axis to produce rotation of the rotor, means to selectively inject fuel into the combustion chamber and to effect ignition thereof at any point in the 360° of revolution thereof, and means restraining the reaction propulsion means against rotation about its own axis while revolving about the rotor axis, whereby the thrust axis maintains a definite predetermined angle relative to a given plane including the axis of the rotor, and means to selectively vary said predetermined angle, the steps of selectively controlling, during power plant operation, the ratio of rotational thrust and linear thrust by varying the point in the 360° of revolution at which the fuel is injected and ignited, and selectively varying, during power plant operation, the predetermined angular relation between the thrust axis and the said given plane in each power plant of a pair of power plants, whereby the linear thrust of one power plant of each pair may oppose or assist the other.

References Cited in the file of this patent

UNITED STATES PATENTS

| 2,633,922 | Svenson | Apr. 7, 1953 |
| 2,690,809 | Kerry | Oct. 5, 1954 |
| 2,782,861 | Lent | Feb. 26, 1957 |

FOREIGN PATENTS

| 612,189 | Great Britain | Nov. 9, 1948 |